United States Patent
Wolff et al.

(10) Patent No.: US 7,472,353 B1
(45) Date of Patent: Dec. 30, 2008

(54) REMOTE CONSOLE FOR NETWORK APPLICATION SERVERS

(75) Inventors: Gregory J. Wolff, Mountain View, CA (US); Marko Balabanovic, London (GB)

(73) Assignee: Ricoh Co., Ltd., Tokyo (JP)

( * ) Notice: Subject to any disclaimer, the term of this patent is extended or adjusted under 35 U.S.C. 154(b) by 520 days.

(21) Appl. No.: 09/629,781

(22) Filed: Jul. 31, 2000

Related U.S. Application Data

(63) Continuation-in-part of application No. 09/465,982, filed on Dec. 16, 1999.

(51) Int. Cl.
*G06F 3/00* (2006.01)
*G06F 15/16* (2006.01)

(52) U.S. Cl. ............... 715/764; 715/716; 715/733; 715/810; 715/835; 715/764; 715/205; 707/10; 709/219

(58) Field of Classification Search ............... 345/838, 345/727, 728, 764, 704, 716, 719; 707/9, 707/10; 709/201, 203, 216–219; 715/704, 715/716–719, 727, 733, 738, 741, 764, 835, 715/838, 846, 978, 728, 205, 968, 810
See application file for complete search history.

(56) References Cited

U.S. PATENT DOCUMENTS

| | | | | |
|---|---|---|---|---|
| 5,793,366 A | * | 8/1998 | Mano et al. | 345/733 |
| 5,864,868 A | * | 1/1999 | Contois | 707/104 |
| 5,917,488 A | | 6/1999 | Anderson et al. | |
| 5,966,122 A | | 10/1999 | Itoh | |
| 5,999,173 A | | 12/1999 | Ubillos | |
| 6,097,389 A | * | 8/2000 | Morris et al. | 715/804 |
| 6,121,966 A | | 9/2000 | Teodosio | |
| 6,166,735 A | * | 12/2000 | Dom et al. | 345/764 |
| 6,195,693 B1 | * | 2/2001 | Berry et al. | 709/219 |
| 6,301,586 B1 | * | 10/2001 | Yang et al. | 707/104.1 |
| 6,333,752 B1 | | 12/2001 | Hasegawa et al. | |
| 6,334,025 B1 | | 12/2001 | Yamagami | |
| 6,346,951 B1 | | 2/2002 | Mastrondardi | |
| 6,388,681 B1 | * | 5/2002 | Nozaki | 345/764 |
| 6,389,223 B1 | | 5/2002 | Aotake | |

(Continued)

FOREIGN PATENT DOCUMENTS

JP 07-184160 7/1995

(Continued)

OTHER PUBLICATIONS

J. Kridner et al, "A DSP powered solid state audio system", Mar. 1999, IEEE CNF, vol. 4, pp. 2283-2286.*

(Continued)

*Primary Examiner*—X. L Bautista
(74) *Attorney, Agent, or Firm*—Blakely, Sokoloff, Taylor & Zafman LLP

(57) ABSTRACT

A method and system that organize and retrieve multimedia objects. A controller may select an identifier associated with a media object to send a request to play the media object. The controller may send the request by transmitting the identifier stored in the controller. An appliance receives the request from the controller. The appliance retrieves the media object from a first server via a network connection when the media object is not stored in the appliance. Then the appliance may play the media object.

36 Claims, 8 Drawing Sheets

U.S. PATENT DOCUMENTS

| | | |
|---|---|---|
| 6,418,272 B1 | 7/2002 | Higashiyama |
| 6,446,080 B1 * | 9/2002 | Van Ryzin et al. .......... 707/104 |
| 6,505,160 B1 * | 1/2003 | Levy et al. ................. 704/270 |
| 6,545,689 B1 * | 4/2003 | Tunli .......................... 345/719 |
| 7,096,426 B1 * | 8/2006 | Lin-Hendel ................ 715/711 |
| 7,143,177 B1 * | 11/2006 | Johnson et al. ............. 709/231 |
| 2002/0062357 A1 * | 5/2002 | Srinivasan ................. 709/219 |
| 2003/0140121 A1 * | 7/2003 | Adams ....................... 709/219 |
| 2004/0039741 A1 * | 2/2004 | Benson et al. ................ 707/9 |
| 2005/0120082 A1 * | 6/2005 | Hesselink et al. ........... 709/203 |
| 2005/0268160 A1 * | 12/2005 | Taylor et al. .................... 714/6 |
| 2006/0114987 A1 * | 6/2006 | Roman ................. 375/240.01 |
| 2006/0206493 A1 * | 9/2006 | Lipscomb et al. ............. 707/10 |
| 2007/0180063 A1 * | 8/2007 | Qureshey et al. ............ 709/219 |

FOREIGN PATENT DOCUMENTS

| | | |
|---|---|---|
| JP | 11-039846 | 2/1999 |
| JP | 11-046339 | 2/1999 |
| JP | 11-284957 | 10/1999 |

OTHER PUBLICATIONS

T. S. Perry, "Consumer electronics [Technology 2000 analysis and forecast]", Jan. 2000, vol. 37, Issue 1, pp. 51-56.*

Japanese Office Action Issue date Oct. 12, 2007, JP Patent Application No. 2000-381399.

* cited by examiner

023
REMOTE CONSOLE FOR NETWORK APPLICATION SERVERS

This application is a continuation in part of Ser. No. 09/465,982, filed on Dec. 16, 1999.

FIELD OF THE INVENTION

The present invention relates generally to field of image retrieval and organization. More specifically, the present invention is directed to retrieving and organizing multimedia objects stored on networked services.

BACKGROUND

Multimedia is a term used to describe the combined use of different kinds of information. Examples of the different kinds of information include text documents, music, images, voice recordings, etc. The combined information is sometimes referred to as multimedia objects.

As the World Wide Web (WWW) becomes more popular, it is apparent that multimedia plays a critical role in effectively exchanging and disseminating information among users of the web. Multimedia can be used in many different applications, such as, for example, digital story telling, employee training, online music video, document with voice annotations, etc.

As the use of multimedia expands, there is a need for storing and retrieving the multimedia objects. In order for the multimedia objects to be easily retrievable, the multimedia objects have to be stored in a location where everyone can share and access them. One way of doing this is to store the multimedia objects on servers connected to the Internet. Using the HTTP protocol, a user from anywhere in the world can access the multimedia objects as long as that user knows about the URL associated with the multimedia objects. However, the user may not have control over the server(s) in order to organize the media objects according to their retrieval needs.

One main requirement to this approach is that in order to access the Internet, the user needs to have an Internet access device such as, for example, a personal computer. What is needed is a way to organize the multimedia objects such that users can easily access them.

SUMMARY OF THE INVENTION

A method and system that organize and retrieve multimedia objects are described. In one embodiment, a controller is configured to select an identifier associated with a media object to send a request to play the media object. The controller sends the request by transmitting the identifier stored in the controller. An appliance is configured to receive the request from the controller. The appliance retrieves the media object from a first server via a network connection when the media object is not stored in the appliance. The appliance plays the media object.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
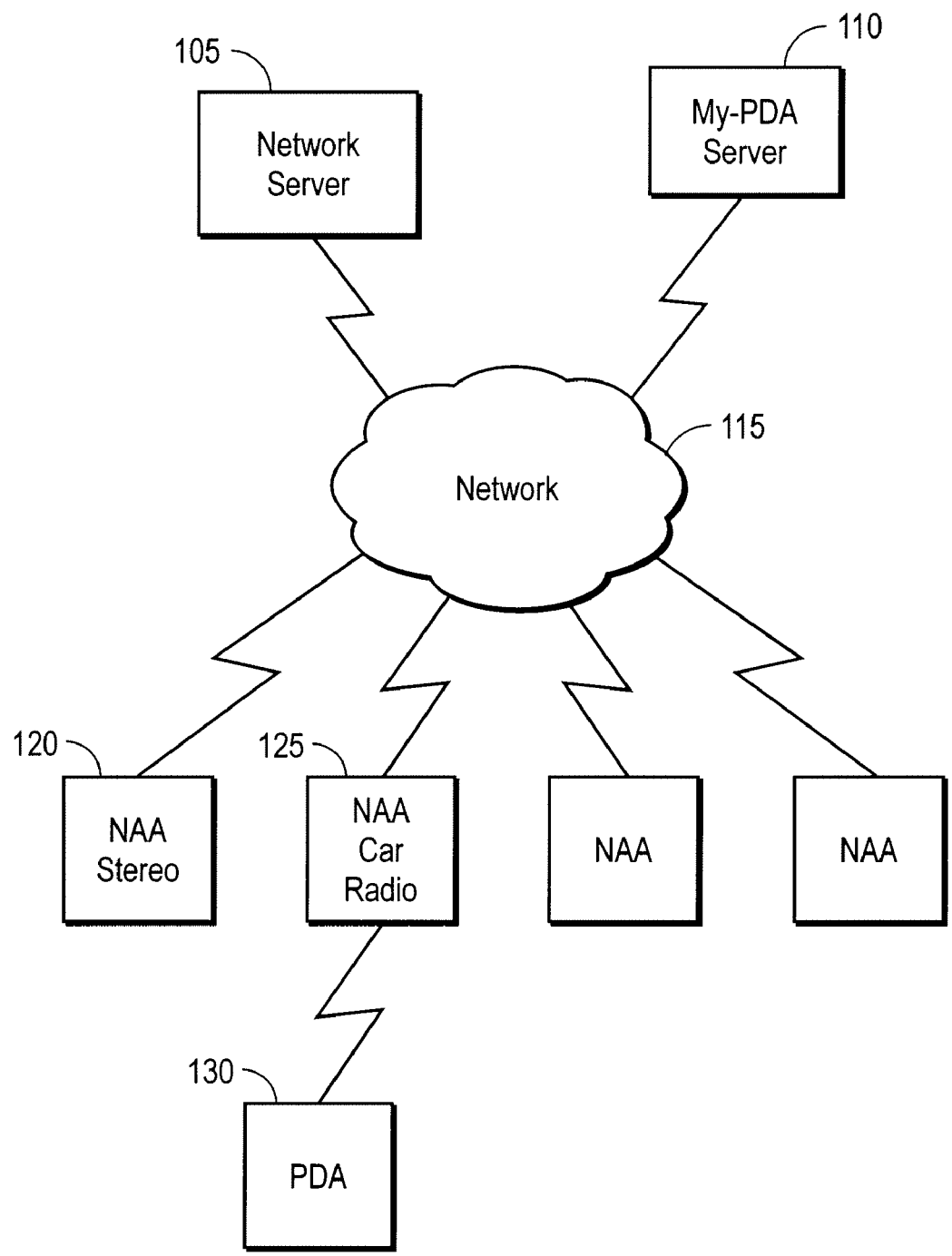
FIG. 1 illustrates an exemplary network embodiment with a remote controller, a network access appliance and a server.

A remote control system for network access appliances is disclosed. The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

A remote controller system that provides a user capabilities to retrieve multimedia objects is disclosed. The multimedia objects may be formed by using a combination of different formats such as, for example, Moving Picture Expert Group (MPEG) video's, MPEG audio Layer-3 (MP3), music compact discs (CD), etc. The multimedia objects are also referred to as media objects. In one embodiment, the system is a hand held device such as, for example, the Personal Digital Assistant (PDA) from Palm Inc. in Santa Clara, Calif., that allows the user to remotely select a media object from a network access appliance (NAA). The network access appliance is connected to a network allowing it to retrieve media objects stored in one or more servers. The servers may communicate with the NAA through the same network such as, for example, the Internet. In one embodiment, the NAA has a local cache that stores the media objects. For example, the NAA cache may store media objects that the user has identified as the user's favorites. This allows the NAA to quickly respond to the user's request when the user selects a favorite media object. When the NAA cache does not have the requested selection, the NAA retrieves the requested selection from a specified server.

FIG. 1 illustrates an exemplary network embodiment with the remote controller, the network access appliance and the server. When the user points the remote controller 130 at an NAA 120, 125, 128 the remote controller 130 transmits sufficient information for the NAA 120, 125, 128 to identify the desired request from the user. In one embodiment, the communication between the remote controller 130 and the NAA 120, 125, 128 uses the Infrared Data Association (IrDA) Data Protocols specification with the Infrared Object Exchange Protocol (Ir OBEX) Data Protocol as published by the Infrared Data Association (IrDA). Using this protocol, the remote controller 130 sends a resource identifier such as, for example, a uniform resource locator (URL), to the NAA 120, 125, 128 to request the NAA 120, 125, 128 to play the media object associated with the resource identifier. The NAA 120, 125, 128 then retrieves the media object from the network (e.g., Internet) or from a NAA local cache, sends an acknowledgement to the remote controller 130, and begins playing/displaying the media object.

In one embodiment, the remote controller 130 sends multiple URLs in one request and the NAA 120, 125, 128 plays each in order. Optionally, the remote controller 130 may send (e.g., upload) the actual media object to be played. In one embodiment, the remote controller 130 may send a request to the NAA 120, 125, 128 for the resource identifier of the currently playing object. The NAA 120, 125, 128 responds by sending the resource identifier and optionally a reduced graphical representation (e.g., thumbnail image) of the object. Optionally, the NAA 120, 125, 128 may also send data comprising the object.

Depending on the type of NAA 120, 125, 128 and the request, the NAA 120, 125, 128 may play the media object associated with the request when the media object is an audio clip or a video clip, or the NAA 120, 125, 128 may display the media object when the media object is a document. There may be different NAA types to handle the different formats of the media objects.

In one embodiment, a media object is displayed as a thumbnail on the remote controller 130. The remote controller 130 may also store the resource identifier (e.g., URL) corresponding to each of the thumbnail images. For example, to play a desired media object the user selects the corresponding thumbnail image and presses a play button. The media object may need to be compatible with the NAA 120, 125, 128 in order for it to be played by the NAA 120, 125, 128. In one embodiment, an error message may be sent by the NAA 120, 125, 128 to the remote controller 130 indicating a format incompatibility. For example, when the user selects a media object corresponding to a multimedia document while pointing the remote controller 130 to the car radio NAA 125, an incompatible format error message is received by the remote controller 130. The NAA 120, 125, 128 can be any device capable of receiving the requests from the remote controller 130.

In one embodiment, each of the media objects stored or played by the NAA is associated with a resource identifier. For example, the stereo NAA 120 of FIG. 1 may be playing a song that it does not have in its local cache. Since the NAA 120 knows about the resource identifier associated with that song, the NAA 120 can retrieve the song from network server 105. In one embodiment the network server 105 stores multiple media objects.

In another embodiment, a personalized server in the network is available to provide the users of the remote controller 130 a way to maintain the information stored on the remote controller 130. Each user of the remote controller 130 has a personalized server 110 such as, for example, "My PDA Server" to keep track of all the services associated with the remote controller 130. In one embodiment, "My PDA Server" is implemented as a server directory corresponding to each remote controller 130, and all the different personalized servers are located in a server system. The user may add new resource identifiers to the personalized server 110, and the user may remove resource identifiers from the personalized server 110. In other words, the personalized server 110 keeps a copy of each resource identifier stored in the remote controller 130. Furthermore, the personalized server may also keep a copy of the media object corresponding to each of the resource identifiers.

When the remote controller 130 is synchronized with the personalized server 110, all the thumbnail images and the corresponding resource identifiers are loaded onto the remote controller 130. The process of synchronization may be done through a docking cradle connected to the Internet. In one embodiment, the NAA 120, 125, 128 periodically accesses the personalized server 110 and update the local cache in the NAA with the appropriate media objects based on the resource identifiers stored in the personalized server 110. The media objects associated with these resource identifiers may be located at different sites in the network.

Figure 2:
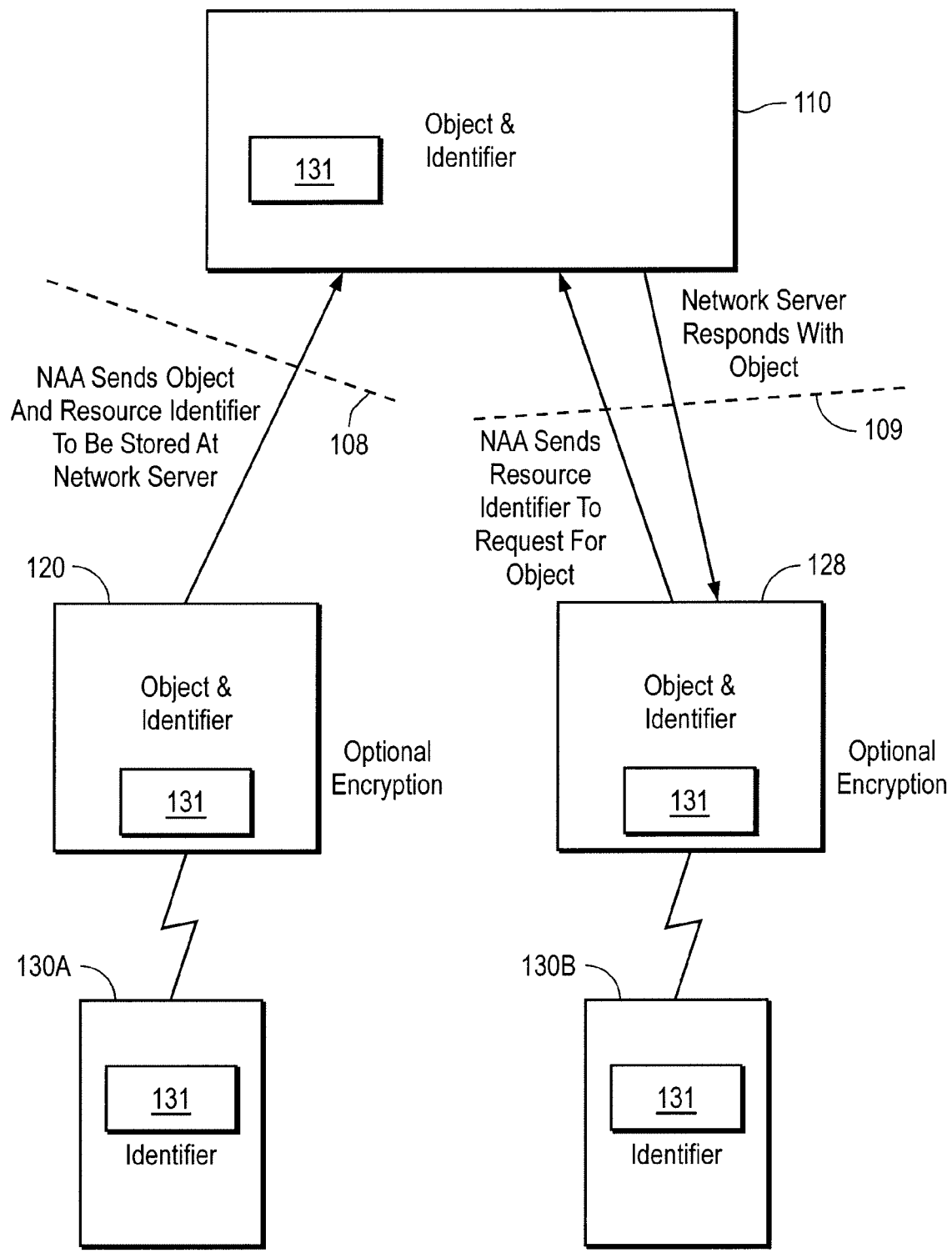
FIG. 2 is an exemplary diagram illustrating the remote controller accessing multiple network access appliances.

FIG. 2 is a diagram illustrating one exemplary embodiment of accessing media objects on multiple NAA devices. Device 130A is a remote controller. In this diagram, the device 130A is the same remote controller as the device 130B, just at a different time and location, and is referred to as the remote controller 130. Initially, a copy of the media object 131 is stored in the NAA 120. This copy may be obtained by any number of methods such as, for example, downloaded from a server, copied over from the remote controller 130, read off a physical media format such as, for example, a compact disc (CD), wireless transfer from a digital camera, or other means. Automatically or in response to a request from the remote controller 130, the NAA 120 makes a connection with the personalized server 110 and transfers a copy of the media object 131 to the personalized server 110. In one embodiment, the NAA 120 may encrypt the media object 131 using a key obtained from the remote controller 130. In one embodiment, the remote controller 130 also provides a unique identifier for the media object 131 to the NAA 120. The NAA 120 then transfers this unique identifier a long with the media object 131 to the personalized server 110. In an alternative embodiment, the NAA 120 or the personalized server 110 assigns a unique identifier to the media object 131 and transmits this unique identifier back to the remote controller 130.

At some later time, the remote controller 130 may request the NAA 120 to play the media object 131 by transmitting the unique identifier associated with the media object 131 to the NAA 128 as described above. The NAA 128 may not be able to communicate directly with the NAA 120 to request the media object 131 due to the firewall 108 or other reasons. However, the NAA 128 can communicate with the personalized server 110 and request the media object 131 using the unique identifier provided by remote controller 130. The personalized server 110 then sends the media object 131 to the NAA 128. The NAA 128 may optionally decrypt the media object 131 using a key provided by the remote controller 130.

Figure 3:
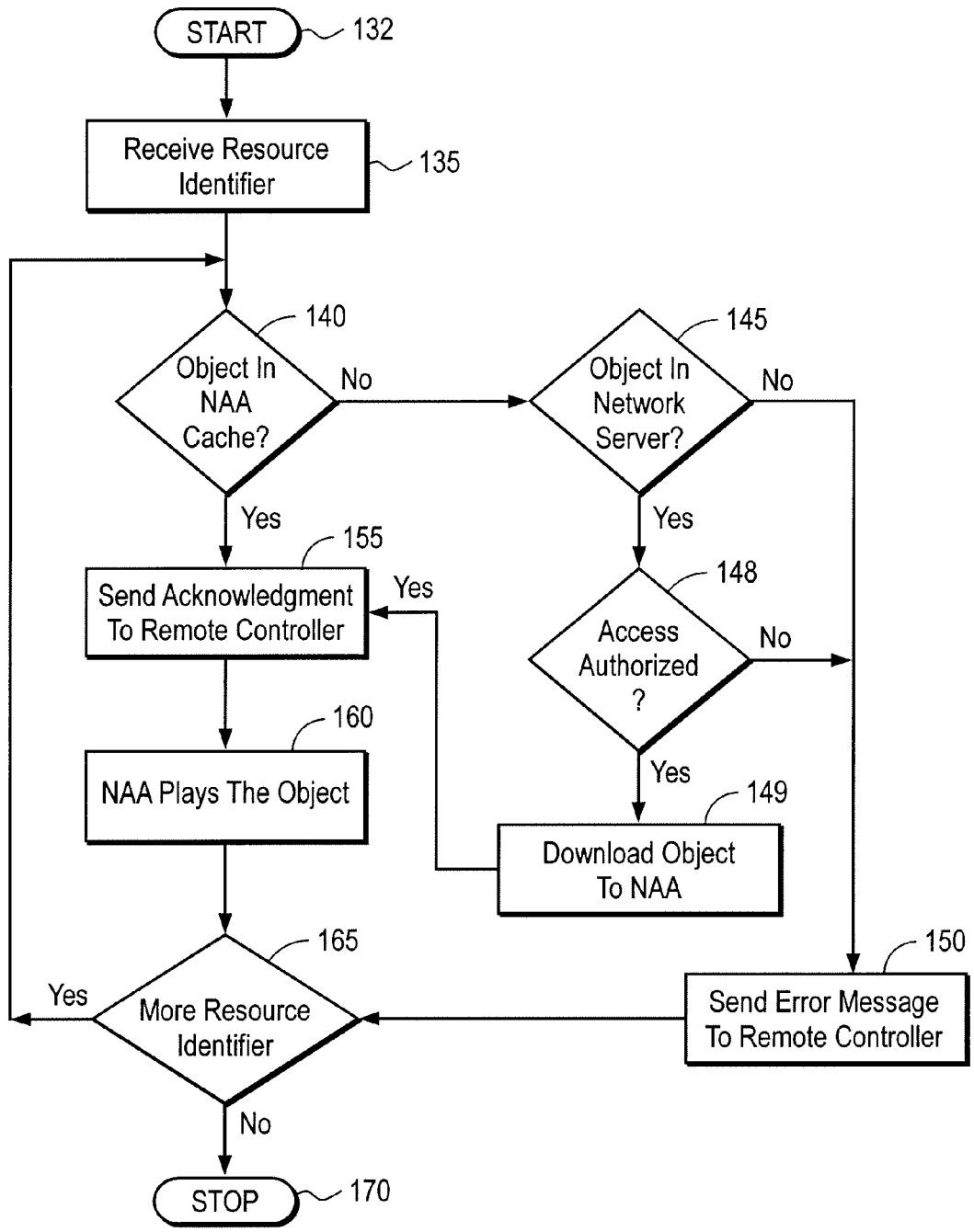
FIG. 3 is an exemplary flow diagram illustrating a request to play a media object.

FIG. 3 is a flow diagram illustrating an exemplary request to play a media object. The flow diagram starts at block 132. When the user activates a play function, such as, for example, pressing a play button on a remote controller, the remote controller sends one or more resource identifiers corresponding to the media object(s) to the specified NAA using a communication channel such as, for example, IrOBEX. At block 135, the NAA receives the resource identifier(s) and uses it as an identifier to locate the requested media object. For each resource identifier, the NAA first determines to see if the resource identifier for the requested media object may have already been stored in the cache within the NAA, as shown in block 140. When the requested media object is found in the cache, the NAA proceeds by sending an acknowledgement to the remote controller, as shown in block 155. Alternatively, when the requested media object is not found in the cache, the NAA attempts to locate the requested media object, using the resource identifier, in a network server (e.g., network server 105 of FIG. 1), as shown in block 145. When the requested media object is not found in the cache or in the network server, an error message is sent to the remote controller, as shown in block 150.

At block 145, when the requested media object is found in the network server, an authentication may be performed to determine if the user is authorized to retrieve the media object from the network server, as shown in block 148. In one embodiment, the user is authenticated when the user has subscribed to the media object by paying an access fee. Authentication information, such as, for example, a user name and password may be sent to the NAA in conjunction with the requested media object. When the user is not authenticated, an authentication failure message is sent to the remote controller, as shown in block 150. The remote controller may re-send the same resource identifier request with the appropriate authentication such as, for example, the user name and password. When the user is authenticated, the requested media object is sent (e.g., downloaded) from the network server to the NAA, as shown in block 149. An acknowledgment may be sent by the NAA to the remote controller, as shown in block 155. The media object corresponding to the resource identifier is then played by the NAA, as shown in block 160. For example, when the NAA is a stereo receiver and the remote controller sends a resource identifier corresponding to a particular song, the NAA plays that song. When the NAA is a personal computer and the resource identifier sent by the remote controller corresponds to a particular document, the NAA displays that particular document. In block 165, a determination is made to see if there is any remaining resource identifier to be processed. When there are more resource identifiers, the flow returns to block 140 to process the next resource identifier. When all the resource identifiers have been processed, the flow stops at block 170.

Figure 4:
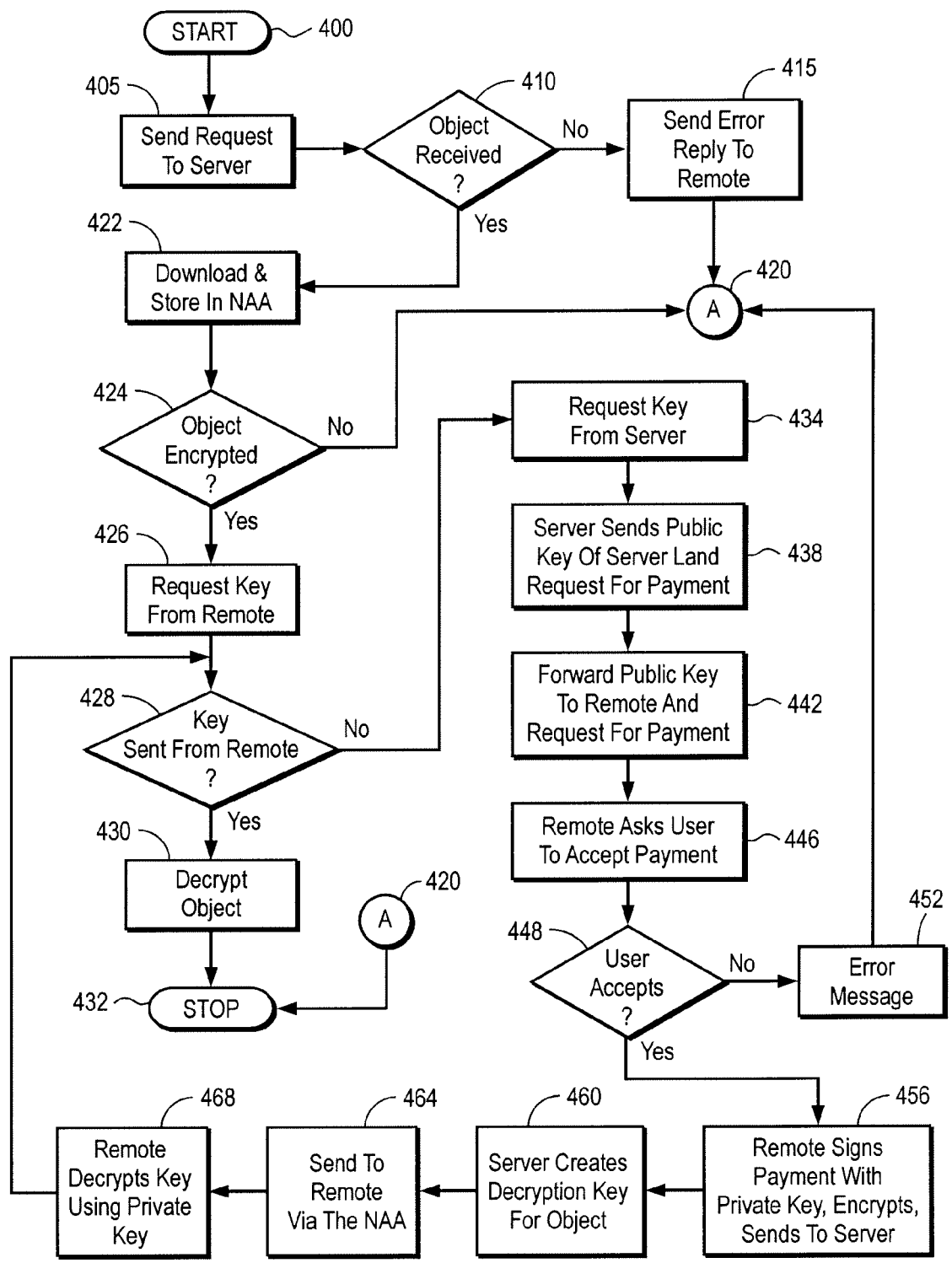
FIG. 4 is an exemplary flow diagram illustrating an access authorization.

FIG. 4 is a flow diagram illustrating one embodiment of an access authorization process performed by the network server. FIG. 4 provides additional detailed information for the process performed in block 148 of FIG. 3. As described in FIG. 3, when the media object is not in the NAA, the NAA may send the resource identifier along with a user name and a password to the network server to request for the media object, as shown in block 405. At block 410, a determination is made to see if the requested media object does not exist in the network server and thus can not be received by the NAA. When that is the case, an error message is sent to the remote controller, as shown in block 415. However, when the requested media object exists in the network server, a copy of the requested media object is downloaded and stored in the NAA, as shown in block 422. The media object sent from the network server may or may not decrypted. If the media object is not encrypted, as determined by block 424, the flow moves to block 420 which ends at block 432, and the process is completed.

When the media object sent by the network server is encrypted, the NAA requests for a private key from the remote controller, as shown in block 426. If the remote controller has the private key (e.g., the user of the remote controller is authorized), then it is used to decrypt the media object, as shown in blocks 428 and 430. The process is completed at block 432.

However, when the remote controller does not have the key, the process flows from block 428 to block 434. At block 434, the NAA sends a request for a decryption key to the network server. At block 438, the network server responds to the NAA with a public key of the network server and request the NAA to pay to access the requested media object. At block 442, the NAA forwards the network server public key and the payment request to the remote controller. At block 446, the remote controller requests the user to accept the payment requirement from the network server. At block 448, a determination is made to see if the user accepts the payment requirement. If the user rejects the payment requirement, an error message may be generated by the NAA to indicate that the request to play the media object can not be satisfied, as shown in block 452. The process then flows to block 420 and is completed at block 432.

If the user accepts the payment requirement, the process flows from block 448 to block 456. At block 456, the remote controller signs a payment information with a private key. The remote controller then encrypts the payment information with the network server public key. In one embodiment, the encrypted payment information is then sent to the network server via the NAA along with the original request for the media object. In another embodiment, the network server remembers the requested media object from the previous request, and the remote controller may only need to send the encrypted payment information to the network server.

At block 460, the network server creates an encryption key for the requested media object. The network server also encrypts the encryption key for the requested media object with the private key of the remote controller. At block 464, the encrypted encryption key for the requested media object is sent by the network server to the remote controller via the NAA. At block 468, the remote controller decrypts the encryption key for the requested media object using the remote controller private key. The encryption key for the requested media object is then sent to the NAA. The process flows back to block 428 where the NAA receives the encryption key for the requested media object from the remote controller. At block 430, the NAA uses the encryption key for the requested media object to decrypts the media object. The process is completed at block 432.

Figure 5:
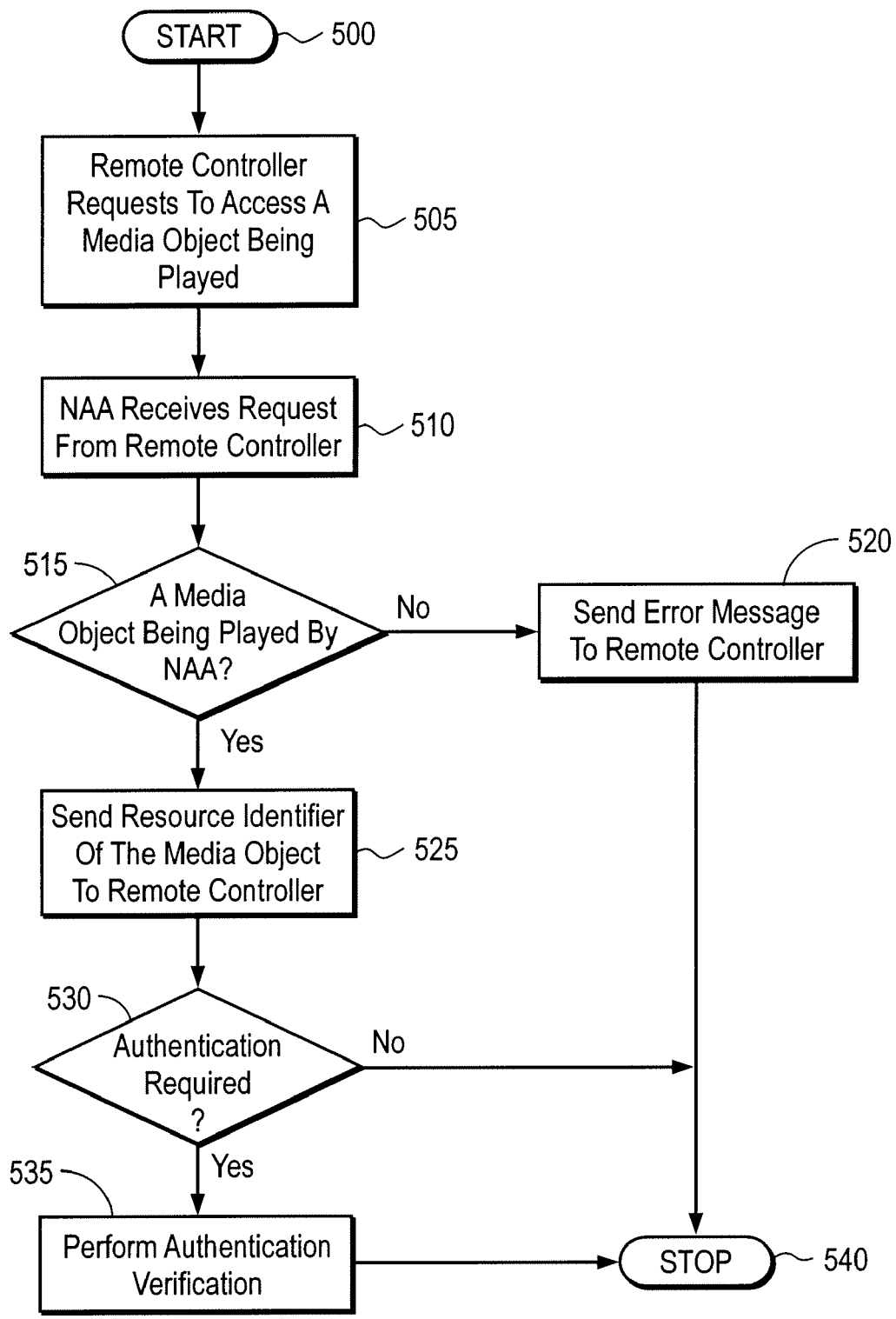
FIG. 5 is an exemplary flow diagram illustrating a request to acquire a media object.

FIG. 5 is an exemplary flow diagram for processing a request by a remote controller to acquire an object being played. The flow diagram starts at block 500. At block 505, the remote controller sends a request to the NAA to acquire a media object being played on the NAA. For example, the user may initiate this request by pressing an "add" button on the remote controller. The media object may be played in response to a play command from another remote controller. At block 510, the NAA receives the request from the remote controller. At block 515, a determination is made to see if a media object is actually being played by the NAA. For example, the request from the remote controller may have been sent accidentally when the NAA is not playing any media object. Those skilled in the art would recognize that playing the media object may include, for example, displaying a document, playing an audio clip, playing a video clip, etc. When there is no media object being played by the NAA, an error message is sent to the remote controller, as shown in block 520, and the process ends at block 540.

In one embodiment, when there is a media object being played by the NAA, the network server or the NAA creates a unique resource identifier for the media object for that particular remote controller. The NAA then sends this unique resource identifier to the remote controller, as shown in block 525. The unique resource identifier may be used to access/encode authentication information in addition to identify the media object.

The remote controller may need to be authenticated in order to be able to subsequently send a request to play the same media object. For example, there may be a cost associated with having access to the media object. At block 530, a determination is made to see if authentication is required. When there is no such requirement (e.g., the media object is free), the process ends at block 540. However, when the authentication is required, the process flows to block 535 where the authentication process is performed. In one embodiment, the process performed in block 535 is similar to the process performed in the flow diagram of FIG. 4. In another embodiment, the authorization and payment may happen at a later time when user requests to play the object. In this case, the process performed in blocks 530 and 535 are bypassed and the block 525 flows directly to block 540.

Figure 6:
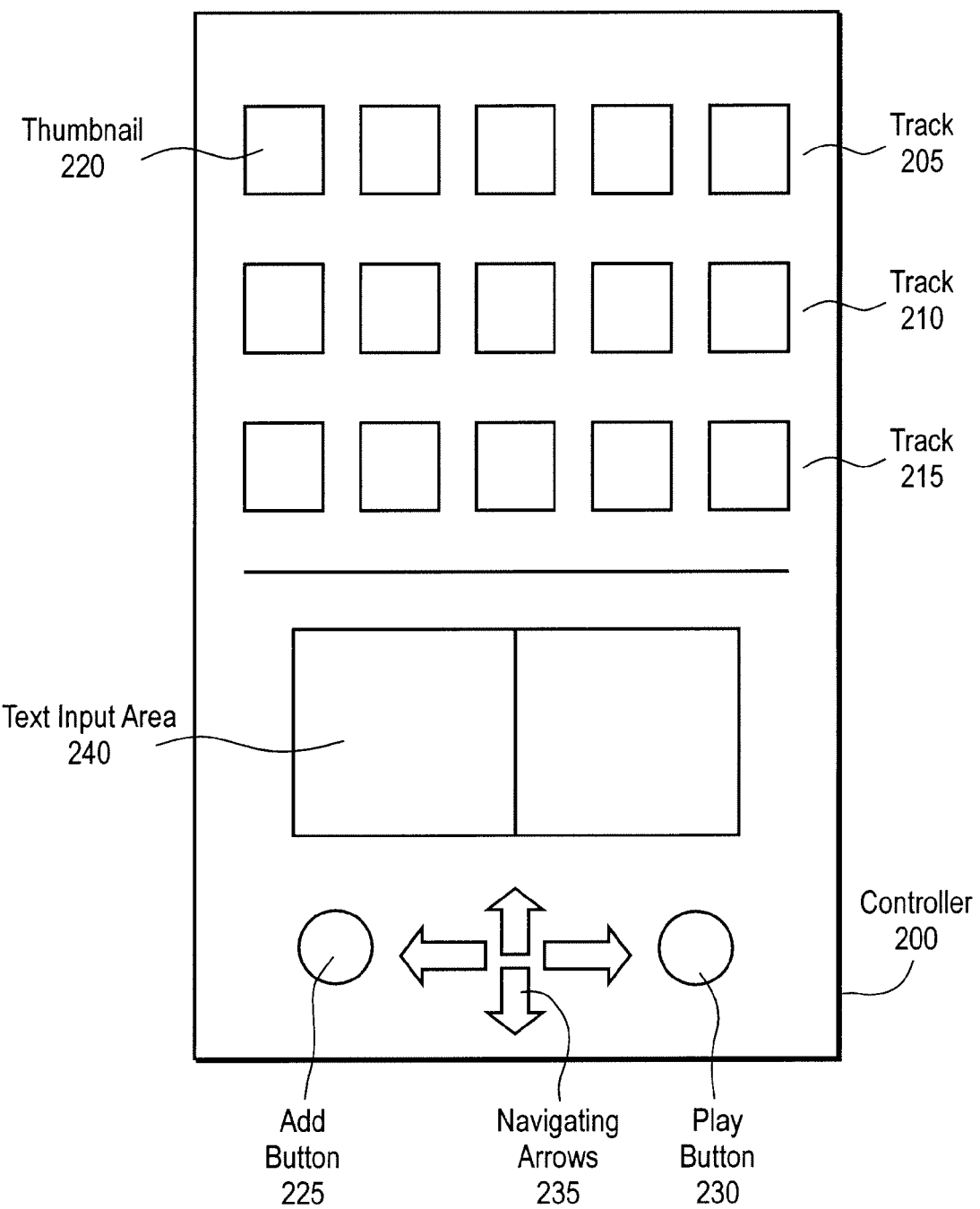
FIG. 6 illustrates an exemplary embodiment of a remote controller.

FIG. 6 illustrates an exemplary embodiment of a remote controller. In this embodiment, there are three tracks 205, 210, 215 with each track having multiple numbers of thumbnail images 220. In one embodiment, a thumbnail image can be selected by using navigating arrows 235 on the remote controller 200. When a desired thumbnail image is selected, and a play button 230 is pressed, the remote controller 200 sends a signal containing the resource identifier out to the NAA. The resource identifier corresponds to the selected thumbnail image. In one embodiment, the outgoing signal is sent through an output port designed for wireless communication.

The exemplary remote controller 200 has three tracks 205, 210 and 215 to allow the user to organize the media objects (thumbnail images). This provides the user an easy way to organize the media objects by the track. For example, the media objects displayed on the first track 205 may be a scrollable list with all the media objects that are known to the remote controller 200. The user can select one of the media objects 220 on any track using the navigation controls. In one embodiment, the third track 215 is used as a working track. For example, the user can create a play list containing the user favorite songs by selecting music media objects from the first track 205 and add them to the third track 215. When the user is satisfied with the play list, the user can move the play list to the second track 210. In one embodiment, each thumbnail image on the second track 210 represents a play list created by the user.

When the remote controller is synchronized with the personalized server 110, the play list is updated in the personalized server 110 and the indicated media objects may eventually be accessed and cached by the appropriate NAA. In one embodiment, the synchronization is done periodically such as, for example, every 24 hours. This capability allows the user to easily find and select individual media objects or entire play lists on the remote controller and request an NAA to play them. When the NAA has cached the media objects (by examining stored play lists) the user will not have to wait for any downloads from the network server. Other functions available on the remote controller may include "stop", "pause", etc. to provide the user additional control capabilities. It would be apparent to one skilled in the art that there may be other ways of organizing the media objects to make them easily retrievable. For example, the media objects may be organized using two or four tracks, in a hierarchical list or just a list of the resource identifiers.

In one embodiment, the remote controller 200 of FIG. 6 has an "add" button 225 that allows the user to add the resource identifier of the song currently played to the remote controller 200. Upon receiving the "add" request signal from the remote controller 200, the NAA responds with the resource identifier information. Similarly, the resource identifier for a multimedia document is transmitted when the document is being displayed by a document NAA. In one embodiment, each thumbnail is stored along with additional information about the associated media object such as, for example, the date the media object was created or authentication and payment information. In another embodiment, the remote controller 200 provides the user a capability to generate text information about the media objects. For example, the user may use the text input area 240 to add notes or comments about the selected media object.

In yet another embodiment, the remote controller 200 may also include the ability for the user to record audio narratives associated with the selected media object. Additionally, the remote controller 200 may also include the ability to communicate with other remote controllers to exchange or share media objects. For example, the user of the remote controller may send a favorite play list to another user.

Figure 7:
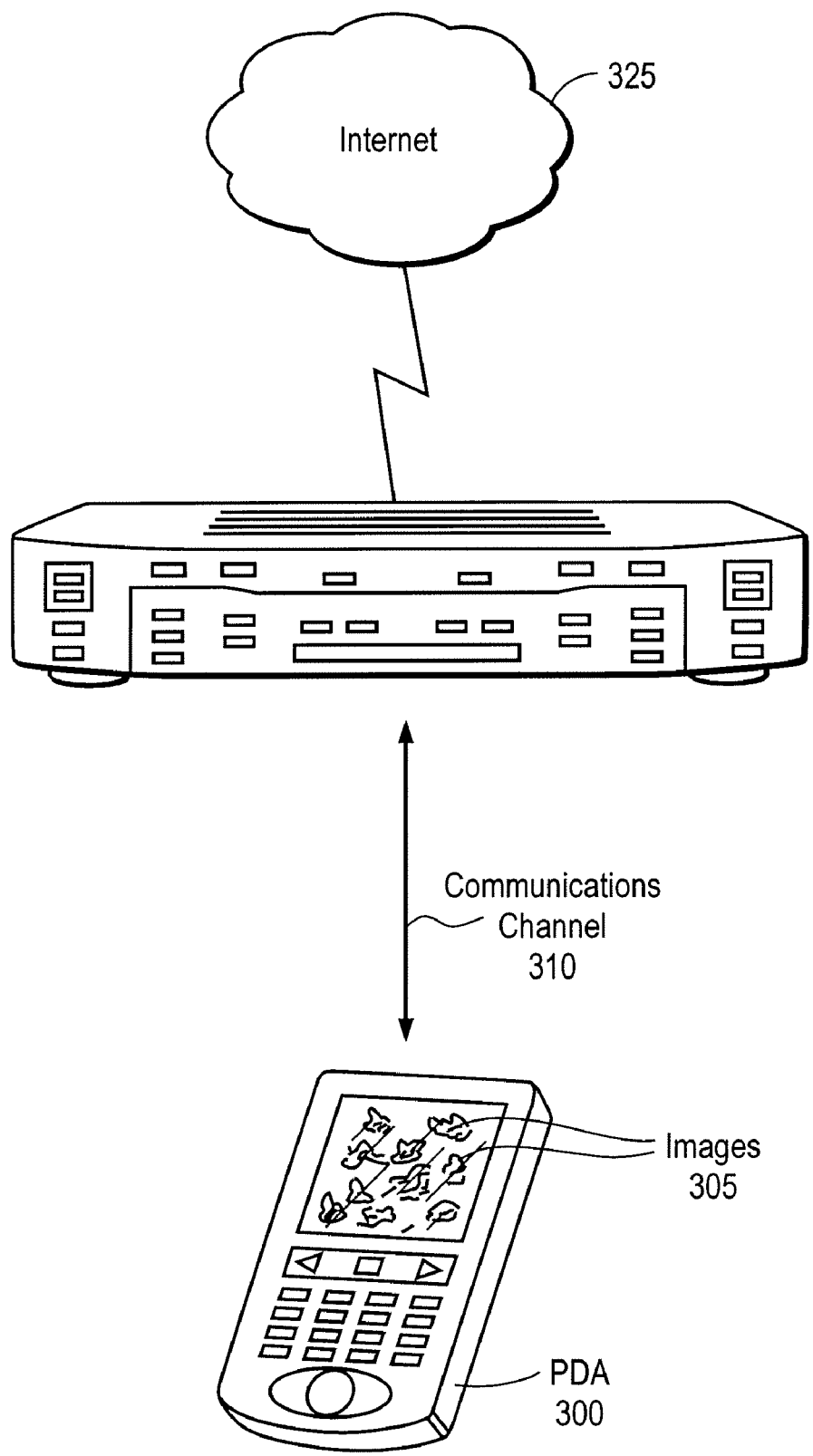
FIG. 7 illustrates an exemplary representation of a remote controller with a stereo network access appliance.

FIG. 7 illustrates an exemplary representation of a remote controller with a stereo network access appliance. In one embodiment, the remote controller 300 is a PDA. The PDA 300 has three tracks of thumbnail images 305. Each thumbnail image can be associated with a media object and a corresponding resource identifier. The communication channel 310 between the PDA 300 to the stereo NAA 320 is bi-directional. This allows the NAA 320 to receive commands or requests from the PDA 300 and to transmit information to the PDA 300. For example, the PDA may transmit the resource identifier of the song that the user wants to add to the play list on the PDA 300. The stereo NAA 320 is connected to the Internet 325 to periodically update the content of its cache.

Figure 8:
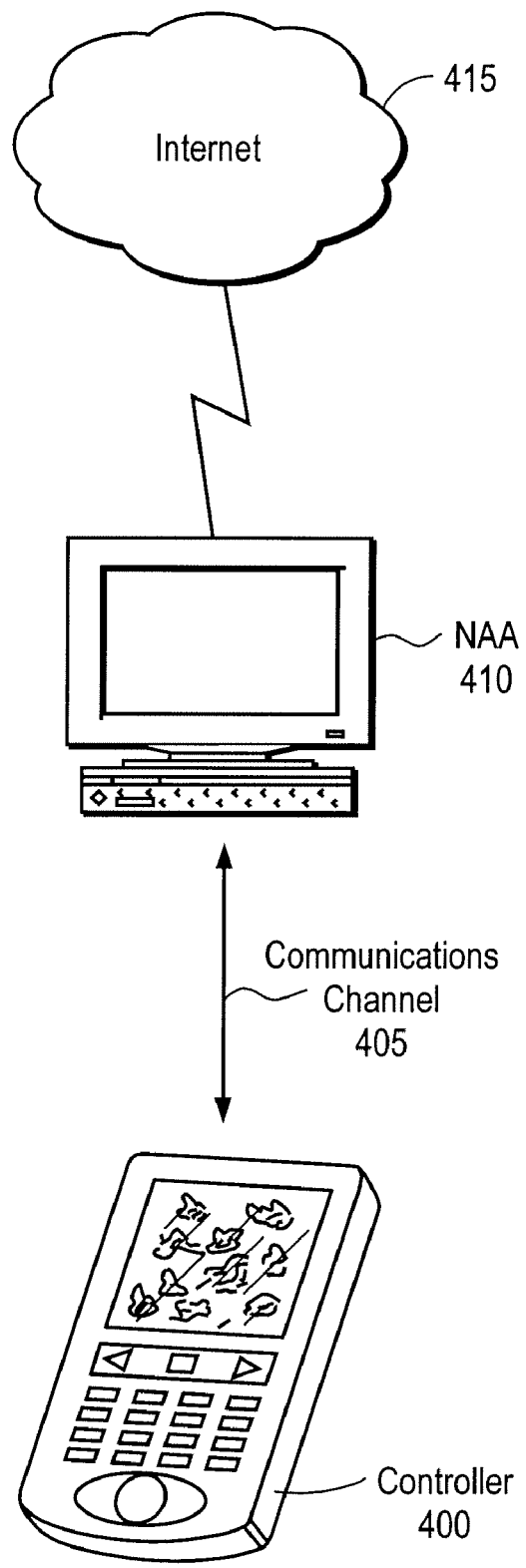
FIG. 8 illustrates an exemplary representation of a remote controller with a document network access appliance.

FIG. 8 illustrates an exemplary representation of a remote controller with a document network access appliance. The PDA 400 communicates with the document NAA 410 through the communication channel 405. As discussed previously, the communication channel 405 may be a wireless channel. The NAA 410 may be any device capable of displaying a document such as, for example, a personal computer. The NAA 410 accesses the Internet to retrieve necessary information to update its cache storage. This updating process allows the NAA 410 to respond quickly to the user's request. In one embodiment, when cache storage is large enough, the user may have all of the requests satisfied locally without the NAA 410 having to access the Internet. It would be apparent to one skilled in the art that the NAA 410 can be any Internet connected device capable of playing the media object of a compatible format. For example, the NAA 410 can be a television that can be used to play a video related media object.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A system comprising:
a controller configured to select an identifier associated with a media object and to send a request to play the media object identified by the identifier, wherein the controller sends the request by wirelessly transmitting the request having the identifier stored in the controller over a first network, the first network being a wireless network;
an appliance configured to receive the request having the identifier from the controller over the wireless network, to determine whether the identified media object is stored in the appliance, to retrieve the media object from a first server via a second network different than the first network when the media object is not stored in the appliance, and to play the media object in response to the request, wherein the controller and the first server are synchronized on a predetermined time period to provide the controller with identifiers for identifying each media object stored on the first server.

2. The system of claim 1, wherein the first server stores the media objects corresponding to the identifiers stored in the controller.

3. The system of claim 1, wherein the media object is retrieved from the first server using the identifier received from the controller.

4. The system of claim 1, further comprising a second server coupled to the network, the second server storing at least the media objects stored in the first server.

5. The system of claim 4, wherein the appliance is further configured to retrieve the media object from the second server when the media object is not found in the first server.

6. The system of claim 5, wherein the media object retrieved from the second server is in a decrypted form.

7. The system of claim 5, wherein the media object retrieved from the second server is in an encrypted form.

8. The system of claim 7, wherein a decryption key for the media object is stored in the controller.

9. The system of claim 8, wherein the decryption key is stored in the controller after the controllers sends a payment information to the second server.

10. The system of claim 9, wherein the appliance receives the decryption key from the controller to decrypt the media object.

11. The system of claim 1, wherein the identifier is selected by selecting a visual representation of the identifier.

12. The system of claim 11, wherein the visual representation comprises a thumbnail image representing the media object.

13. The system of claim 12, wherein the controller organizes thumbnail images in groups.

14. The system of claim 13, wherein the groups comprise:
a first group including all thumbnail images stored in the controller, and
a second group including selected thumbnail images from the first group.

15. The system of claim 14, wherein the second group comprises:
a first subgroup including one or more playlists, each of the playlists comprising one or more thumbnail images; and
a second subgroup including one or more thumbnail images in a playlist being created.

16. The system of claim 15, wherein the controller sends one play list to the appliance to request the one play list be played by the appliance.

17. The system of claim 15 wherein the controller comprises a display screen to display thumbnail images in the first group and in the second group.

18. The system of claim 17, wherein the controller further comprises a microphone to record an audio annotation associated with one of the thumbnail images, and a text input area to generate text to associate with the one thumbnail image.

19. The system of claim 1, wherein the appliance is operable to play a media object not stored in the controller, and wherein the controller imports the identifier associated with the media object by sending a request to import the identifier not stored in the controller.

20. The system of claim 19, wherein in response to the request to import the identifier not stored in the controller, the appliance sends the identifier and a reduced visual representation of the corresponding media object.

21. The system of claim 20, wherein the reduced visual representation is a thumbnail image of the corresponding media object.

22. The system of claim 19, wherein the request to import the identifier not stored in the controller is sent with payment information.

23. The system of claim 1, wherein the controller is a portable controller capable of wirelessly controlling the appliance over the first network, wherein the first network is a local network and the second network is an external network, and wherein the controller wirelessly controls the appliance to retrieve and play the media object within the appliance.

24. The system of claim 1, wherein the appliance is one in a group comprising a personal computer, a stereo receiver, and a television.

25. The system of claim 24, wherein the controller operates with multiple appliances.

26. The system of claim 1, wherein the media object is one in a group comprising a document, an audio clip and a video clip.

27. A system comprising:
   first means for selecting an identifier associated with a media object and to initiate a request to play the media object identified by the identifier, the first means wirelessly transmitting the request having the identifier stored in the first means over a first network, the first network being a wireless network;
   second means for receiving the request having the identifier over the wireless network, retrieving the media object using the identifier, and playing the media object; and
   third means for storing the media object, wherein the second means retrieves the media object from the third means at certain times, via a second network different than the first network, when the media object is not stored in the second means, wherein the third means for storing the media objects comprises means for synchronizing with the first means to enable the first means to have the identifiers associated with each of the media objects stored in the third means.

28. The system of claim 27, further comprising fourth means coupled to the network, the fourth means for providing the media object when the media object is not in the third means.

29. The system of claim 28, further comprising means for performing access authorization when the media object is retrieved from the fourth means.

30. The system of claim 29, wherein the means for performing access authorization comprises means for encrypting the media object and means for decrypting the media object.

31. The system of claim 27, wherein the first means is operable with one or more second means.

32. The system of claim 27, wherein the first means comprises means for organizing the identifiers using thumbnail image representations of the media objects associated with the identifiers.

33. A method of a network access appliance (NAA), comprising:
   wirelessly receiving a request from a portable device over a first network, the request including an identifier for identifying a media object to be played, wherein the media object is not stored within the portable device;
   in response to the request, determining whether the identified media object is locally stored within the NAA based on the identifier extracted from the request;
   accessing a first server over a second network to retrieve the media object if the media object is not locally stored within the NAA, the second network being different than the first network;
   playing the retrieved media object within the NAA; and
   periodically synchronizing the portable device with the first server to provide the portable device with identifiers for identifying each media object stored on the first server.

34. The method of claim 33, wherein the first network is a local wireless network coupling the portable device to the NAA, and wherein the second network is a wide area network (WAN) coupling the NAA to the first server.

35. The method of claim 33, further comprising:
   determining whether the first server contains the identified media object; and
   accessing a second server over the network to attempt to retrieve the identified media object if the first server does not contain the identified media object.

36. The method of claim 33, wherein the media object is encrypted, wherein the method further comprises:
   retrieving a key from the portable device over the first network, wherein the key is stored within the portable device; and
   decrypting the media object within the NAA in order to play the media object downloaded from the first server over the second network.

* * * * *